United States Patent
Yoo et al.

(10) Patent No.: US 8,897,592 B2
(45) Date of Patent: Nov. 25, 2014

(54) METHOD FOR CORRECTING A DEFECT PIXEL

(75) Inventors: Byoung Seok Yoo, Incheon (KR);
Jae-Gwan Jeon, Incheon (KR);
Bong-Ju Jun, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 597 days.

(21) Appl. No.: 13/197,811

(22) Filed: Aug. 4, 2011

(65) Prior Publication Data

US 2012/0257825 A1  Oct. 11, 2012

(30) Foreign Application Priority Data

Apr. 6, 2011  (KR) .................. 10-2011-0031756

(51) Int. Cl.
| | |
|---|---|
| *G06K 9/00* | (2006.01) |
| *G06K 9/40* | (2006.01) |
| *G06K 9/62* | (2006.01) |
| *H04N 9/64* | (2006.01) |
| *G06T 5/00* | (2006.01) |
| *H04N 1/407* | (2006.01) |
| *H04N 1/409* | (2006.01) |
| *H04N 5/367* | (2011.01) |
| *H04N 9/04* | (2006.01) |

(52) U.S. Cl.
CPC ...... *H04N 5/367* (2013.01); *G06T 2207/10024* (2013.01); *G06T 2207/20012* (2013.01); *H04N 9/045* (2013.01); *G06T 5/005* (2013.01)
USPC ........... 382/275; 382/167; 382/261; 348/242; 348/247; 358/3.26

(58) Field of Classification Search
None
See application file for complete search history.

(56) References Cited

U.S. PATENT DOCUMENTS

| | | | |
|---|---|---|---|
| 6,381,374 B1 | 4/2002 | Pourjavid | |
| 6,768,513 B1 | 7/2004 | Watanabe et al. | |
| 6,904,169 B2 | 6/2005 | Kalevo et al. | |
| 7,202,894 B2 | 4/2007 | Kaplinsky et al. | |
| 7,242,819 B2 | 7/2007 | Jiang | |
| 7,433,534 B2 | 10/2008 | Kawakubo | |
| 2003/0222995 A1* | 12/2003 | Kaplinsky et al. | 348/247 |
| 2005/0276510 A1* | 12/2005 | Bosco et al. | 382/275 |
| 2006/0233431 A1* | 10/2006 | Watanabe | 382/128 |
| 2006/0284862 A1* | 12/2006 | Uvarov et al. | 345/204 |

(Continued)

FOREIGN PATENT DOCUMENTS

| | | |
|---|---|---|
| EP | 2101487 A2 | 9/2009 |
| JP | 2002344814 A * | 11/2002 |

(Continued)

*Primary Examiner* — Randolph I Chu
*Assistant Examiner* — Nathan Bloom
(74) *Attorney, Agent, or Firm* — Cantor Colburn LLP

(57) ABSTRACT

A method for correcting a defect pixel includes extracting a pixel value of a central pixel, and pixel values of each of a plurality of neighboring pixels around the central pixel in an image sensor by using a color filter; calculating reference levels by multiplying each the pixel value of the plurality of neighboring pixels by a weight value; calculating a total number of cases where the pixel value of the central pixel is larger or smaller than the reference level as a first comparison value or second comparison value, respectively; determining the central pixel is a defect pixel where the first or second comparison value is larger than a first or second control register value, by comparing the comparison values with the control register values, respectively; and correcting the central pixel determined as the defect pixel.

12 Claims, 5 Drawing Sheets

(56) References Cited

U.S. PATENT DOCUMENTS

| | | | |
|---|---|---|---|
| 2008/0117318 A1* | 5/2008 | Aoki | 348/246 |
| 2008/0298716 A1* | 12/2008 | Yamagata | 382/275 |
| 2009/0040343 A1* | 2/2009 | Kao | 348/246 |
| 2009/0102951 A1 | 4/2009 | Ikeda | |
| 2009/0160992 A1 | 6/2009 | Inaba et al. | |
| 2009/0214129 A1* | 8/2009 | Quan | 382/260 |
| 2010/0026862 A1* | 2/2010 | Nishiwaki | 348/246 |
| 2010/0040303 A1* | 2/2010 | Bosco et al. | 382/261 |
| 2010/0215267 A1* | 8/2010 | Aldrich et al. | 382/167 |
| 2012/0050563 A1* | 3/2012 | Cote et al. | 348/223.1 |
| 2013/0236096 A1* | 9/2013 | Cerundolo | 382/167 |

FOREIGN PATENT DOCUMENTS

| | | |
|---|---|---|
| JP | 2006-148230 A | 6/2006 |
| JP | 2007-174104 A | 7/2007 |
| JP | 2007-251698 A | 9/2007 |
| JP | 2007-258837 A | 10/2007 |
| KR | 100363359 B | 11/2002 |
| KR | 1020050102729 A | 10/2005 |
| KR | 100825821 B | 4/2008 |

* cited by examiner

FIG. 1

| G | R | G | R | G | R | G | R |
|---|---|---|---|---|---|---|---|
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |

METHOD FOR CORRECTING A DEFECT PIXEL

This application claims priority to Korean Patent Application No. 10-2011-0031756 filed on Apr. 6, 2011, and all the benefits accruing therefrom under 35 U.S.C. §119, the entire contents of which are incorporated herein by reference.

BACKGROUND OF THE INVENTION (a) Field of the Invention

The invention relates to a method for correcting a defect pixel.

(b) Description of the Related Art

An image signal passing through an image sensor which converts an external image into an electric signal, is converted into a digital image signal through sampling and quantizing processes. The image sensor for acquiring the image has a plurality of pixels.

In the case of a digital image input device such as a digital camera, a mobile phone with a camera, and the like, arrangement of a color filter such as a Bayer filter which extracts only a single color in one pixel position in order to reduce the number of color samples is used and a red, green and blue ("RGB") full-color image is created by processing a sensor Bayer pattern outputted by the image sensor through an image signal process ("ISP").

In the case of the Bayer sensor, defect pixels are generated due to a processing problem or various environmental factors in a pick-up process.

The defect pixels are largely divided into dead pixels and hot pixels. The dead pixel is a phenomenon in which a fixed value of black or white is shown because the pixel itself does not represent the color by a sensor processing problem in general. On the other hand, the hot pixel as a noise of the pixel is generated in the case where the temperature of the sensor is increased due to the use of the camera for a long time, where sensitivity of the sensor is increased by increasing International Standarization Organization ("ISO") speed, or where an exposure time of light is increased by lengthening a shutter speed.

In photographing, the defect pixels as described above have a serious effect on image quality. As a technique for removing the dead pixel as one of the defect pixels, a method of replacing a current input pixel with a neighboring pixel value or an average value has been used when the current input pixel coincides with stored position information, by separately allocating a memory or register capable of designating a position of the dead pixel. In addition, by comparing a level difference value between the current input pixel and the neighboring pixels with a reference value, when the difference is large, a method of determining the current input pixel as the hot pixel and processing it as the average value has been used.

The above information disclosed in this Background section is only for enhancement of understanding of the background of the invention and therefore it may contain information that does not form the prior art that is already known in this country to a person of ordinary skill in the art.

BRIEF SUMMARY OF THE INVENTION

In the case of a method of separately storing the position of a defect pixel in a storing device, the cost is increased. In the case of a correction technology in comparing the difference between the current input pixel and the neighboring pixel for the reference value, it is ambiguous to define the reference level value determining whether or not the hot pixel is according to a characteristic of the image.

The invention provides a method for correcting a defect pixel including an effective algorithm capable of removing all defect pixels using one algorithm without using a separate memory for removing the defect pixels.

An exemplary embodiment of the invention provides a method for correcting a defect pixel. The method includes: extracting a pixel value of a central pixel, and pixel values of each of a plurality of neighboring pixels around the central pixel in an image sensor, by using a color filter; calculating reference levels by multiplying each the pixel value of the neighboring pixels by a weight value; calculating a total number of cases where the pixel value of the central pixel is larger than the reference level as a first comparison value, and a total number of cases where the pixel value of the central pixel is smaller than the reference level as a second comparison value, by comparing each of the calculated reference levels with the pixel value of the central pixel; determining the central pixel is a defect pixel where the first comparison value is larger than a first control register value, by comparing the first comparison value with the first control register value, or where the second comparison value is larger than a second control register value, by comparing the second comparison value with the second control register value; and correcting the central pixel determined as the defect pixel.

In an exemplary embodiment, the correcting the central pixel may include replacing the pixel value of the central pixel with an average pixel value of the plurality of neighboring pixels.

In an exemplary embodiment, the correcting the central pixel may further include determining whether or not each of the plurality of neighboring pixels is the defect pixel.

In an exemplary embodiment, the determining whether or not each of the plurality of neighboring pixels is the defect pixel may use the same method as the determining whether the central pixel is the defect pixel.

In an exemplary embodiment, the correcting of the central pixel may include replacing the pixel value of the central pixel with an average pixel value of the neighboring pixels which are not the defect pixel among the plurality of neighboring pixels.

In an exemplary embodiment, the weight value may be about 1 to about 15.

In an exemplary embodiment, where the first comparison value is larger than the first control register value, the central pixel may be determined a hot pixel.

In an exemplary embodiment, the first control register value may be about 5 to about 7.

In an exemplary embodiment, where the second comparison value is larger than the second control register value, the central pixel may be determined a dead pixel.

In an exemplary embodiment, the second control register value may be about 5 to about 7.

In an exemplary embodiment, the color filter may be a filter in an n×n (n is an integer of 3 or more) matrix form including pixels having the same color in a Bayer pattern.

According to exemplary embodiments of the invention, a method for correcting the defect pixels including a new form of algorithm is provided. Therefore, the defect pixels are more accurately determined and corrected such that quality of a displayed image can be improved.

BRIEF DESCRIPTION OF THE DRAWINGS

The above and other features of this disclosure will become more apparent by describing in further detail exemplary embodiments thereof with reference to the accompanying drawings, in which:

FIG. 1 is a plan view illustrating an exemplary embodiment of a Bayer pattern.

DETAILED DESCRIPTION OF THE INVENTION

Figure 2:
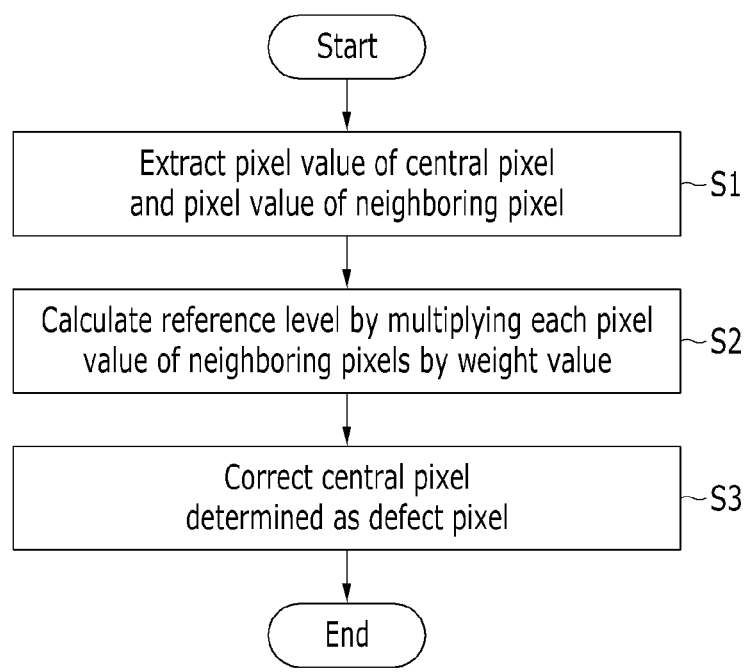
FIG. 2 is a flowchart illustrating an exemplary embodiment of a method for correcting defect pixels according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention. On the contrary, exemplary embodiments introduced herein are provided to make disclosed contents thorough and complete and sufficient transfer the spirit of the invention to those skilled in the art.

In the drawings, the thickness of layers, films, panels, regions, etc., are exaggerated for clarity. It will be understood that when a layer is referred to as being "on" another layer or substrate, it can be directly on the other layer or intervening them may also be present. Like reference numerals designate like elements throughout the specification.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

FIG. 1 is a plan view illustrating an exemplary embodiment of a Bayer pattern.

Referring to FIG. 1, in an image formed by a combination of pixels, red pixels and green pixels alternate in one row, and blue pixels and green pixels alternate in a next row directly adjacent to the one row. In each pixel, pixel data acquired by an external image is included.

Figure 3:
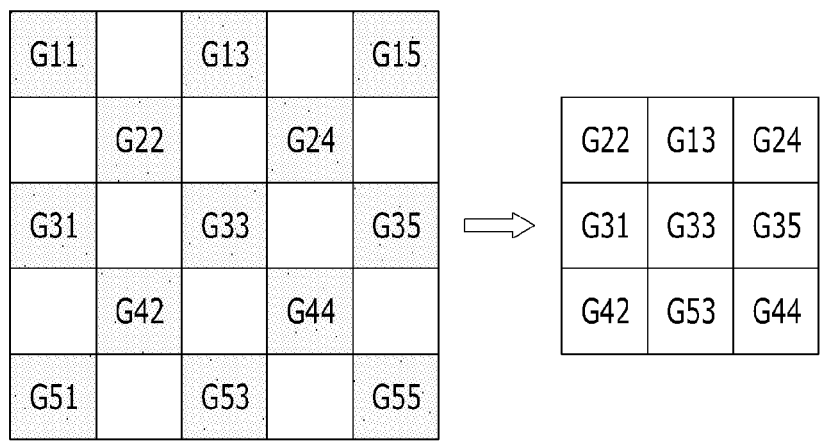
FIGS. 3 to 5 are plan views illustrating exemplary embodiments of a positional relationship between a central pixel and neighboring pixels in the invention.
Figure 4:
Figure 5:
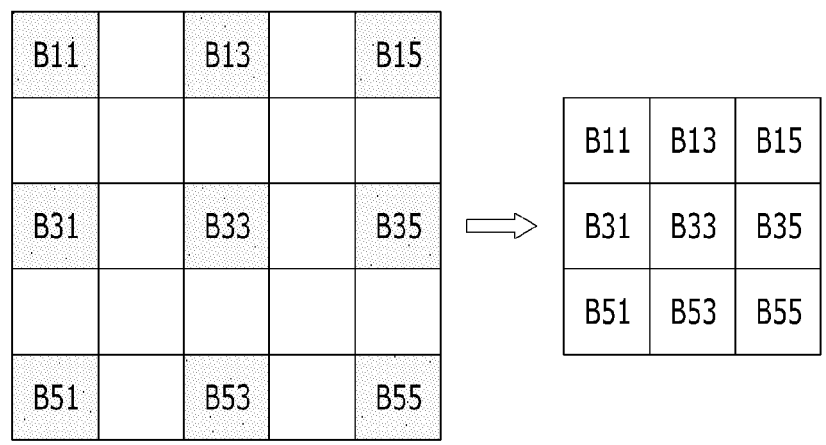

FIG. 2 is a flowchart illustrating an exemplary embodiment of a method for correcting defect pixels according to the invention. FIGS. 3 to 5 are plan views illustrating exemplary embodiments of a positional relationship between a central pixel and neighboring pixels in the invention.

According to the invention, the exemplary embodiment of the method for correcting a defect pixel includes extracting a pixel value of a central pixel and pixel values of a plurality of neighboring pixels around the central pixel (S1). Herein, the central pixel and the plurality of neighboring pixels around the central pixel have the same color.

The extracting the pixel value of the central pixel and the pixel values of the plurality of neighboring pixels around the central pixel may use color filters. In this case, the color filter may include a filter in an n×n matrix form including pixels having the same color in the Bayer pattern shown in FIG. 1. Herein, n may be an integer of 3 or more.

In order to determine the defect pixel, for example, in the case where a pixel inputted at the center is a G pixel, a filter of a form shown in FIG. 3 is used, in the case where a pixel inputted at the center is a R pixel, a filter of a form shown in FIG. 4 is used, and in the case where a pixel inputted at the center is a B pixel, a filter of a form shown in FIG. 5 is used.

In detail, in the case where the central pixel is the G pixel, a plurality of neighboring pixels G22, G13, G24, G31, G35, G42, G53, and G44 with respect to the central pixel G33 are selected as represented by the right matrix of FIG. 3 by collecting the neighboring pixels having the same color which are adjacent to the central pixel G33 among a plurality of G pixels of the left matrix of FIG. 3.

Herein, the neighboring pixels are total eight and include G22 pixel, G13 pixel, G24 pixel, G31 pixel, G35 pixel, G42 pixel, G53 pixel, and G44 pixel.

In the case where the central pixel is the R pixel, a plurality of neighboring pixels R11, R13, R15, R31, R35, R51, R53, and R55 with respect to the central pixel R33 are selected as represented by the right matrix of FIG. 4 by collecting the neighboring pixels having the same color which are adjacent to the central pixel R33 among a plurality of R pixels of the left matrix of FIG. 4.

Herein, the neighboring pixels are total eight and include R11 pixel, R13 pixel, R15 pixel, R31 pixel, R35 pixel, R51 pixel, R53 pixel, and R55 pixel.

In the case where the central pixel is the B pixel, a plurality of neighboring pixels B11, B13, B15, B31, B35, B51, B53, and B55 with respect to the central pixel B33 are selected as represented by the right matrix of FIG. 5 by collecting the neighboring pixels having the same color which are adjacent to the central pixel B33 among a plurality of B pixels of the left matrix of FIG. 5.

Herein, the neighboring pixels are total eight and include B11 pixel, B13 pixel, B15 pixel, B31 pixel, B35 pixel, B51 pixel, B53 pixel, and B55 pixel.

In order to select the central pixel and the neighboring pixels for correcting the defect pixel, the exemplary embodiment uses the color filter in a 5×5 matrix form, but is not limited thereto and n is an integer of 3 or more in the n×n.

Next, referring again to FIG. 2, the method for correcting a defect pixel includes calculating reference levels by multiplying the pixel value of each of the plurality of neighboring pixels by a weight value (S2).

In the exemplary embodiment, in order to determine whether or not the central pixel is defective, the G pixel is selected and the following Equations 1 and 2 are represented.

$$[G33>\text{first weight value}\times G22]+[G33>\text{first weight value}\times G13]+[G33>\text{first weight value}\times G24]+ \\ [G33>\text{first weight value}\times G31]+[G33>\text{first weight value}\times G35]+[G33>\text{first weight value}\times G42]+[G33>\text{first weight value}\times G53]+[G33>\text{first weight value}\times G44] \geq \text{first control register value} \quad \text{Equation 1}$$

Herein, [A] (e.g., [G33>first weight value×G22]) of Equation 1 is defined as [A]=1 if satisfying the "A" condition and as [A]=0 if not.

When the pixel value of the central pixel G33 is larger than a value defined by multiplying a neighboring pixel G22, G13, G24, G31, G35, G42, G53, and G44 by the first weight value, that is, the reference level, there is great possibility that the central pixel G33 is defective. In Equation 1, the number of occurrences where the pixel value of the central pixel G33 is larger than the reference level, that is, a first comparison value is determined and then, is compared with the first control register value.

Finally, when the first comparison value is equal to or larger than the first control register value, the central pixel G33 is determined as the defect pixel. In the exemplary embodiment, the defect pixel corresponds to the hot pixel.

In Equation 1, the first weight value is in the range of about 1 to about 15 and is a tuning point for finding an optimum value for a sensor module. The first control register value may select an appropriate reference through a test in an external environment. The first control register value may be adjusted as approximately about 5 to about 7.

$$[G33<\text{second weight value}\times G22]+[G33<\text{second weight value}\times G13]+[G33<\text{second weight value}\times G24]+[G33<\text{second weight value}\times G31]+ \\ [G33<\text{second weight value}\times G35]+[G33<\text{second weight value}\times G42]+[G33<\text{second weight value}\times G53]+[G33<\text{second weight value}\times G44] \geq \text{second control register value} \quad \text{Equation 2}$$

Herein, [B] (e.g., [G33>first weight value×G22]) of Equation 2 is defined as [B]=1 if satisfying the "B" condition and as [B]=0 if not.

When the pixel value of the central pixel G33 is smaller than a value defined by multiplying a neighboring pixels G22, G13, G24, G31, G35, G42, G53, and G44 by the second weight value, that is, the reference level, there is great possibility that the central pixel G33 is defective. In Equation 2, the number of occurrences where the pixel value of the central pixel G33 is smaller than the reference level, that is, a second comparison value is determined and then, is compared with the second control register value.

Finally, when the second comparison value is equal to or larger than the second control register value, the central pixel G33 is determined as the defect pixel. In the exemplary embodiment, the defect pixel corresponds to the dead pixel.

In Equation 2, the second weight value is in the range of about 0.1 to about 1.0 and is a tuning point for finding an optimum value for a sensor module. The second control register value may select an appropriate reference through a test in an external environment. The second control register value may be adjusted as approximately about 5 to about 7.

As described above, in order to determine whether or not the central pixel is defective, the G pixel is selected and the following Equations 1 and 2 are represented, but even in the case where the R pixel and the B pixel are selected, the same Equations may be applied.

Next, the exemplary embodiment of the method for correcting a defect pixel includes correcting the central pixel determined as the defect pixel (S3).

Before correcting the central pixel, the method may further include determining whether or not each neighboring pixel except for the central pixel corresponds to the defect pixel. The reason to further include the determining whether or not each neighboring pixel except for the central pixel corresponds to the defect pixel is because one or more defect pixel may be gathered in the neighboring pixels. That is, whether the neighboring pixel is a hot pixel or a dead pixel may be determined by setting the first weight value and the second weight value for each neighboring pixel except for the central pixel, and using Equation 1 and Equation 2 described above.

After determining whether the neighboring pixel is the defect pixel, finally, the pixel value of the central pixel may be replaced with an average pixel value of the neighboring pixels which are not the defect pixel, among the neighboring pixels as the following Equation 3.

$$\text{Correction value} = \frac{\text{Sum of pixel values of neighboring pixels}}{\text{The number of neighboring pixels which are not the defect pixels}} \quad \text{Equation 3}$$

An exemplary embodiment of an image processing system may include inputting the image, correcting the defect pixel, interpolating, and gamma-correcting. The exemplary embodiment of correcting the defect pixel according to the invention is at an early stage of the image processing system such that diffusion of a noise can be reduced or effectively prevented as soon as possible in a process, and detection and correction of the defect pixel are simultaneously performed with respect to the dead pixel and the hot pixel such that the size of a hardware can be decreased.

Further, in the exemplary embodiment of the image processing system, since the position of the defect pixel of an image pickup device does not need to be detected prior to the process of the image processing system, and the process for the detection may be omitted, the manufacturing cost can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for correcting a defect pixel, the method comprising:
    extracting a pixel value of a central pixel, and pixel values of each of a plurality of neighboring pixels around the central pixel in an image sensor, by using a color filter;
    calculating reference levels by multiplying each the pixel value of each of the neighboring pixels by a weight value;
    calculating a total number of cases where the pixel value of the central pixel is larger than each of the reference levels as a first comparison value, and a total number of cases where the pixel value of the central pixel is smaller than each of the reference levels, as a second comparison value, by comparing each of the calculated reference levels with the pixel value of the central pixel;

determining the central pixel is a defect pixel
- where the first comparison value is larger than a first control register value, by comparing the first comparison value with the first control register value, or
- where the second comparison value is larger than a second control register value, by comparing the second comparison value with the second control register value; and correcting the central pixel determined as the defect pixel.

2. The method of claim 1, wherein:
the correcting the central pixel comprises replacing the pixel value of the central pixel with an average pixel value of the plurality of neighboring pixels.

3. The method of claim 2, wherein:
the correcting the central pixel further comprises determining whether or not each of the plurality of neighboring pixels is the defect pixel.

4. The method of claim 3, wherein:
the determining whether or not each of the plurality of neighboring pixels is the defect pixel uses the same method as the determining the central pixel is a defect pixel.

5. The method of claim 4, wherein:
the correcting the central pixel comprises replacing the pixel value of the central pixel with an average pixel value of the neighboring pixels which are not the defect pixel among the plurality of neighboring pixels.

6. The method of claim 1, wherein:
the weight value is 1 to 15.

7. The method of claim 6, wherein:
where the first comparison value is larger than the first control register value, the central pixel is determined as a hot pixel.

8. The method of claim 7, wherein:
the first control register value is 5 to 7.

9. The method of claim 1, wherein:
the weight value is 0.1 to 1.0.

10. The method of claim 9, wherein:
where the second comparison value is larger than the second control register value, the central pixel is determined as a dead pixel.

11. The method of claim 10, wherein:
the second control register value is 5 to 7.

12. The method of claim 1, wherein:
the color filter is a filter in an n×n (n is an integer of 3 or more) matrix form comprising pixels having the same color in a Bayer pattern.

* * * * *